Jan. 4, 1927.
J. D. MAXWELL
1,613,183
VALVE
Original Filed June 15, 1925
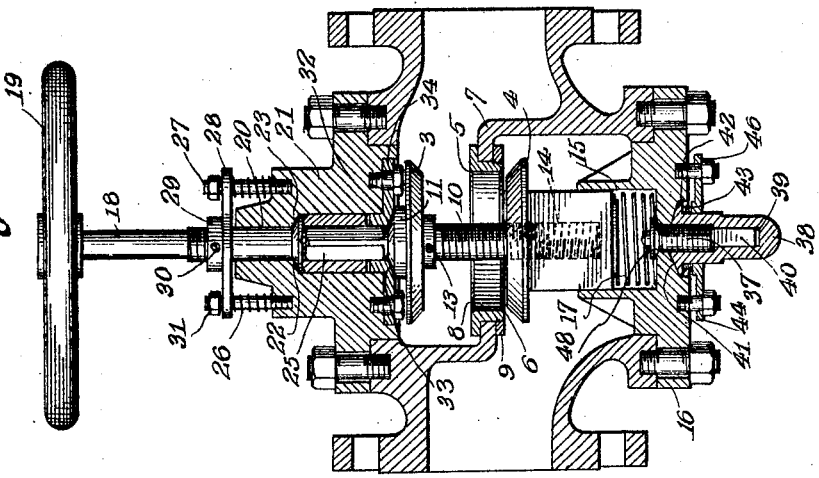
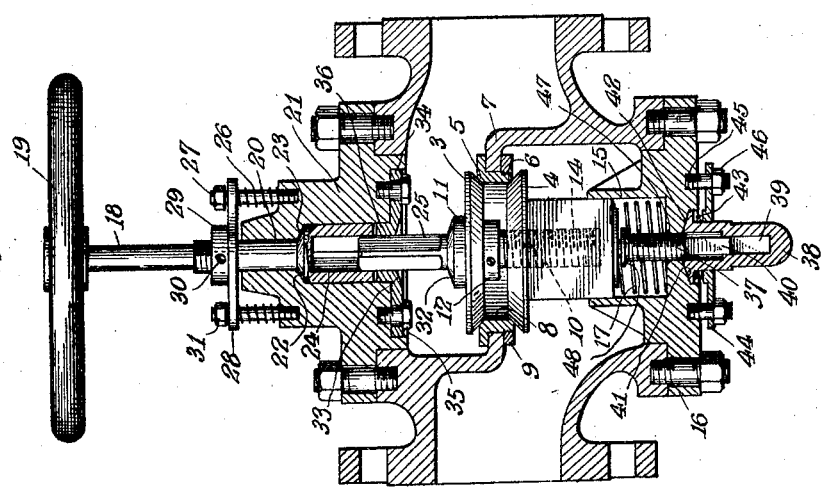
INVENTOR
James D. Maxwell
BY
Philip S. McLean
ATTORNEY Patented Jan. 4, 1927.

1,613,183

UNITED STATES PATENT OFFICE.

JAMES D. MAXWELL, OF BROOKLYN, NEW YORK.

VALVE.

Application filed June 15, 1925, Serial No. 37,135. Renewed October 6, 1926.

One of the important objects of this invention is to provide a valve for high pressure live steam lines and the like, which will be free of all packing and which will be fully sealed at all times in the open, the closed or any intermediate positions of the valve parts.

Special objects also are to make the valve fully sealed irrespective of the direction of steam flow, to utilize the pressure of the steam or other fluid as an aid to automatically maintaining a constant seal, to provide a simple, practical way of closing the valve in case of breakage of the normal valve operating parts and to accomplish the objects mentioned and others which will hereinafter appear in a thoroughly practical, efficient, easily assembled and relatively inexpensive structure.

These objects are attained by certain novel features of construction, combinations and relations of parts, including broadly a self-seating seal for the operating stem, a double seal for the stem when the valve is open and a constantly sealed auxiliary screw for closing the valve.

In the drawing accompanying and forming part of this specification, one particular embodiment of the invention is disclosed but it should be understood that the structure may be varied without departure from the broad spirit and scope of the invention as herein defined and claimed.

Figure 1 is a cross sectional view or the valve showing the valve parts closed and positively secured in such relation.

Figure 2 is a similar view showing the auxiliary valve closing screw retracted, the upper valve fully open and the lower valve as just leaving its seat.

The valve illustrated in the present disclosure is of the double type, involving upper and lower valve elements 3, 4, arranged in opposing relation for cooperation with the oppositely facing valve seats 5, 6 in the partition wall 7. These valve seats are shown carried by a flange bushing 8 seated in a bore in the partition and secured there by a screw flange 9.

The upper valve is shown as rotatably engaged on a screw stem 10 between a fixed collar 11 above and a collar 12 below the same, the latter being indicated as secured by a screw 13.

The lower valve is illustrated with a screw seat 14 in the body of the same, receiving the screw stem 10 and as having an externally angular shank portion sliding non-rotatably in a correspondingly angular socket 15 provided in the lower bonnet or cap 16. A spring 17 interposed in this socket beneath the valve exerts its force to hold said valve lifted in engagement with its seat.

The screw stem is rotated by an operating stem 18 shown as equipped for the purpose with a hand wheel 19. A constant seal is provided for this operating stem in the illustration by journaling it in a bearing 20 in the upper bonnet 21 and by providing it with a conical shoulder 22 engaging a correspondingly conical seat 23 at the inner end of such bearing. A sliding coupling is provided between the ends of the operating stem and screw stem consisting in the disclosure of an angular socket 24 in the inner end of the operating stem receiving the correspondingly angular outer end portion 25 of the screw stem.

To hold the sealing faces 22, 23 of the operating stem and valve case constantly engaged, said operating stem is shown as yieldingly supported by springs 26 surrounding external studs 27 and engaging a bridge piece 28 which in turn engages a collar 29 shown as adjustably fixed on the stem by the screw 30. Nuts 31 on the upper screw threaded ends of the studs may be turned down to reduce the lifting effect of the springs or to take the tension off the collar 29 while the same is being adjusted on the stem.

With this structure it will be observed that the operating stem is at all times sealed, irrespective of the position of either or both valve elements and, without losing or impairing this seal, is effective at any time for rotating the screw stem to open or close the valve. The second figure illustrates how, in the opening movement of the valve, the upper valve element is first lifted away from its seat, by the turning of the screw stem in the lower valve element and how when the upper valve element is fully lifted, the further turning movement of the screw stem serves to force the lower valve element downward and away from its seat.

For the purpose of doubly sealing the operating stem when the valve is open, the upper fixed or integral collar 11 of the screw stem is shown as formed with a conical face 32 for engagement with a correspondingly conical sealing face 33 on the bonnet. This latter sealing face is shown as carried by a flange 34 removably secured in a socket 35 in the inner wall of the bonnet, said flange having a central bushing 36 forming a guide and bearing for the angular portion of the screw stem. It will be evident that this extra seal becomes effective as soon as the shoulder on the screw stem engages its seat and as these engaging faces provide the thrust shoulders by which the lower valve is forced away from its seat, it will be clear that the lower valve does not become unseated until both seals for the operating stem have been made effective. The removable character of the flange member 34 makes it possible to readily substitute a new part if the thrust shoulders should become worn after long continued operation of the valve.

If the lower valve closing spring 17 should become broken or lose its tension, or if other parts should get out of order, the lower valve may be lifted to its seat, in the illustration by a screw 37 threaded in the lower bonnet in position to directly engage said valve. This screw is shown as sealed at all times by an enclosing cap 38 shown as having an angular socket 39 slidingly receiving the correspondingly angular outer end 40 of the screw and as having at its inner end, a conical face 41 held in sealed engagement with a correspondingly conical face 42 on the bonnet by a surrounding expansion spring 43. For purposes of easy adjustment this spring is shown as engaged at its outer end by a bridge 44 slidingly engaged on studs 45 and shiftable to different positions thereon by the nuts 46.

It will be evident that by turning the nuts 46 the tension at which the adjusting cap 38 is held to its seat may be readily adjusted and it will be evident that by setting up the bridge piece 44 to the extreme limit, the adjusting cap may be secured in any set relation.

A double seal is also provided for the lower valve closing screw in the present disclosure by a conical face 48 on the inner end portion of said screw arranged to engage a correspondingly conical face 47 on the inside of the bonnet, this seal becoming effective when said screw is fully retracted as in Figure 2.

Because of the fact that the valve is sealed at all times, from both sides, it is possible to use this structure in a "loop" circuit, where the flow through the valve may alternately flow in different directions. Also, with the valve fully open, the operating connections both at the top and at the bottom are under double seal. If the valve closing spring or operating connections should fail at any time, the lower valve may be quickly closed by operating the screw 37, the seal of such screw being maintained during such operation of the same, and after thus closing the lower valve, if the flow is from the left in the figures, then the upper bonnet may be lifted off, the screw stem 10 be removed and any repairs or substitution of parts be readily made.

If the pressure is in the opposite direction, from the right in the two views, then, after the valves are closed as in Figure 1, the lower bonnet may be taken off and such repairs or replacements as necessary be readily made.

The structure as a whole is readily assembled and disassembled and the parts are all of a nature to stand hard usage and heavy service.

The external location of the springs not only makes them more accessible for adjustment or repair purposes but positions them away from the extreme heat so that they are unaffected thereby and do not lose their tension. The valve seats, sealing faces and cooperating valve elements may all be made of Monel metal or the like to stand the high temperature and high pressure and the structure and arrangement of these parts is such that they may be assembled readily.

What is claimed is:

1. A valve continuously sealed under all conditions irrespective of the direction of flow or pressure thereon, comprising a valve casing having a passage with oppositely facing seats, oppositely operating valves for cooperation with said seats, a longitudinally traveling screw stem carrying one of said valves and having a screw engagement with the other valve, said other valve having a non-rotative engagement in the valve casing and slidable toward and from its valve seat, a spring urging said valve toward its seat, an operating stem having a sliding driving engagement with the screw stem, said operating stem and the valve casing having conical sealing faces and spring means acting on the operating stem to hold said conical sealing faces engaged irrespective of the position of the operating stem, the screw stem or the oppositely operating valves.

2. A valve continuously sealed under all conditions irrespective of the direction of flow or pressure thereon, comprising a valve casing having a passage with oppositely facing seats, oppositely operating valves for cooperation with said seats, a longitudinally traveling screw stem carrying one of said valves and having a screw engagement with the other valve, said other valve having a non-rotative engagement in the valve casing and slidable toward and from its valve seat, a spring urging said valve toward its seat, an operating stem having a sliding driving engagement with the screw stem, said operating stem and the valve casing having conical sealing faces and spring means acting on the operating stem to hold said conical sealing faces engaged irrespective of the position of the operating stem, the screw stem or the oppositely operating valves, the first valve having a freely rotative mounting on the screw stem, said freely rotative valve and the casing having conical sealing faces engageable when said valve is fully open to afford an extra seal for the operating stem.

3. A valve continuously sealed under all conditions irrespective of the direction of flow or pressure thereon, comprising a valve casing having a passage with oppositely facing seats, oppositely operating valves for cooperation with said seats, a longitudinally traveling screw stem carrying one of said valves and having a screw engagement with the other valve, said other valve having a non-rotative engagement in the valve casing and slidable toward and from its valve seat, a spring urging said valve toward its seat, an operating stem having a sliding driving engagement with the screw stem, said operating stem and the valve casing having conical sealing faces, spring means acting on the operating stem to hold said conical sealing faces engaged irrespective of the position of the operating stem, the screw stem or the oppositely operating valves, a screw stud mounted in the casing for holding the second valve to its seat independently of the spring provided therefor, a rotative cap having a sliding driving engagement over the end of said screw stud, said cap and valve casing having conical sealing faces and means operating on said cap for holding said cooperating sealing faces engaged in all positions of the screw stud and operating cap.

4. In a valve of the character disclosed, a valve casing having a passage with oppositely facing seats, oppositely operating valves cooperating with said seats, a valve operating stem and constantly operative sealing means for said stem effective in all positions of the stem and valve elements, including cooperating sealing faces on the valve casing and stem engaging in the rotative adjustment of the stem, one of the valve members being carried by a longitudinally traveling stem having a sliding coupling with the operating stem and a screw engagement with the other valve element, the screw stem having a sealing face and the casing having a cooperating sealing face engageable thereby when said stem is unscrewed from said other valve member, screw means independent of said screw stem for closing the second valve member and a closed operating member having a sliding coupling with the screw and a constantly sealed engagement with the valve casing.

5. In combination with a casing and a stem projecting thereinto, a cap enclosing the projecting portion of said stem and having a sliding non-rotative connection therewith, whereby said stem will be turned by rotation of the cap, the cap and casing having cooperating conical sealing faces and means engaging the cap to hold said sealing faces in contact.

6. In combination with a casing and a stem projecting thereinto, a cap enclosing the projecting portion of said stem and having a sliding non-rotative connection therewith, whereby said stem will be turned by rotation of the cap, the cap and casing having cooperating conical sealing faces and means engaging the cap to hold said sealing faces in contact, including a bridge piece, a spring interposed between said bridge piece and cap and screw means for advancing the bridge piece.

7. In combination with a casing, a rotatable stem projecting thereinto, a cap enclosing the outer end of said stem and rotatable with respect to the casing, said cap having a conical inner end and the casing having a corresponding conical seat for such end, said conical end of the cap having an annular shoulder and adjustable means engaging said shoulder to thrust the cap in engagement with the seat.

8. A valve continuously sealed under all conditions irrespective of the direction of flow or pressure thereon, comprising a valve casing having a passage with oppositely facing seats, oppositely operating valves for cooperation with said seats, separate and independent mechanisms for holding the respective valves to their seats and a double pair of conical sealing faces between each of said mechanisms and the valve casing operative in the open positions of the valves to provide double seals between said independent valve operating mechanisms and the casing.

In witness whereof, I have hereunto set my hand this 11th day of June, 1925.

JAMES D. MAXWELL.